(12) United States Patent
Bergmayr et al.

(10) Patent No.: US 11,554,939 B2
(45) Date of Patent: Jan. 17, 2023

(54) LOADING CRANE CONTROLLER WITH USER WORN REMOTE CONTROL INPUT AND DISPALY DEVICE

(71) Applicant: Palfinger AG, Bergheim bei Salzburg (AT)

(72) Inventors: Benjamin Bergmayr, Vienna (AT); Paul Handlechner, Mattsee (AT); Richard Reischauer, Schalchen (AT)

(73) Assignee: PALFINGER AG, Bergheim bei Salzburg (AT)

( * ) Notice: Subject to any disclaimer, the term of this patent is extended or adjusted under 35 U.S.C. 154(b) by 355 days.

(21) Appl. No.: 16/829,366

(22) Filed: Mar. 25, 2020

(65) Prior Publication Data

US 2020/0223671 A1 Jul. 16, 2020

Related U.S. Application Data

(63) Continuation of application No. PCT/AT2018/060224, filed on Sep. 25, 2018.

(30) Foreign Application Priority Data

Sep. 26, 2017 (AT) .............................. A 50178/2017

(51) Int. Cl.
*B66C 13/40* (2006.01)
*B66C 13/44* (2006.01)
(Continued)

(52) U.S. Cl.
CPC .............. *B66C 13/40* (2013.01); *G06F 3/165* (2013.01); *G06V 20/10* (2022.01); *G10L 25/51* (2013.01);
(Continued)

(58) Field of Classification Search
CPC ........... H04W 4/38; H04W 4/40; H04W 4/80; H04W 4/35; H04W 4/30; H04W 88/02;
(Continued)

(56) References Cited

U.S. PATENT DOCUMENTS 9,199,825 B2 * 12/2015 Dueckman .............. B66C 13/40
9,269,255 B2   2/2016 Beaulieu et al.
(Continued)

FOREIGN PATENT DOCUMENTS

DE  10 2015 016 848   6/2017
DE  20 2016 002 295   6/2017
(Continued)

OTHER PUBLICATIONS

International Search Report dated Dec. 21, 2018 in International (PCT) Application No. PCT/AT2018/060224.

*Primary Examiner* — Tuan A Tran
(74) *Attorney, Agent, or Firm* — Wenderoth, Lind & Ponack. L.L.P.

(57) ABSTRACT

An operating device includes a crane controller for controlling actuators of the loading crane and for generating sensor data based on the sensor signals, and an input device spatially separated from the crane controller for inputting control commands for the crane controller. The crane controller has a first telecommunications device for exchanging data signals with the input device, and the data signals output by the crane controller include sensor data. The input device has a second telecommunications device for exchanging data signals including control commands with the first telecommunications device. The input device has a transmitter device for outputting data signals. A signaling device is spatially separated from the input device, and has a receiver device for receiving data signals output by the transmitter device and a display device for displaying audio (Continued)

data and/or image data. The signaling device signals the audio data and/or image data to a user.

15 Claims, 6 Drawing Sheets

(51) Int. Cl.
| | | |
|---|---|---|
| *B66C 13/46* | (2006.01) | |
| *B66C 17/00* | (2006.01) | |
| *G06F 3/14* | (2006.01) | |
| *G02B 27/01* | (2006.01) | |
| *H04W 4/38* | (2018.01) | |
| *H04W 4/80* | (2018.01) | |
| *H04W 4/40* | (2018.01) | |
| *G06F 3/16* | (2006.01) | |
| *G10L 25/51* | (2013.01) | |
| *G06V 20/10* | (2022.01) | |
| *B66C 23/42* | (2006.01) | |
| *B66C 23/00* | (2006.01) | |

(52) U.S. Cl.
CPC ............... *H04W 4/38* (2018.02); *H04W 4/40* (2018.02); *H04W 4/80* (2018.02); *B66C 23/42* (2013.01); *B66C 23/54* (2013.01); *B66C 2700/0357* (2013.01); *B66C 2700/088* (2013.01)

(58) Field of Classification Search
CPC ...... H04W 4/00; H04W 4/021; H04B 1/3833; H04B 1/385; H04B 2001/3855; H04B 2001/3861; H04B 2001/3866; H04B 2001/3872; B66C 13/40; B66C 23/42; B66C 23/54; B66C 2700/0357; B66C 2700/088; G06F 3/165; G06V 20/10
See application file for complete search history.

(56) References Cited

U.S. PATENT DOCUMENTS

| | | | |
|---|---|---|---|
| 9,499,125 B2 * | 11/2016 | Akay | .............. B60R 25/01 |
| 9,637,355 B2 | 5/2017 | Henkel et al. | |
| 10,414,635 B2 | 9/2019 | Hayashi | |
| 10,495,880 B2 * | 12/2019 | Rantala | ................ G02B 27/017 |
| 10,503,249 B2 * | 12/2019 | Pagliani | .......... G06Q 10/063114 |
| 10,712,566 B2 * | 7/2020 | Touma | ................... G06F 3/0481 |
| 10,906,784 B2 * | 2/2021 | Schilling | ................. B66C 13/46 |
| 11,086,397 B2 * | 8/2021 | Pagliani | ................ G06T 19/006 |
| 11,339,035 B2 * | 5/2022 | Rantala | ................... B66C 13/40 |
| 2004/0041822 A1 * | 3/2004 | Iizuka | ................... G06T 19/006 |
| | | | 348/E5.022 |
| 2007/0235404 A1 * | 10/2007 | Catanzaro | ............... B66C 13/46 |
| | | | 212/312 |
| 2010/0243594 A1 * | 9/2010 | King | ..................... B66C 15/045 |
| | | | 382/229 |
| 2011/0311127 A1 * | 12/2011 | Mizutani | ................... G06T 7/80 |
| | | | 901/1 |
| 2014/0240484 A1 * | 8/2014 | Kodama | ............... G02B 27/017 |
| | | | 348/86 |
| 2015/0161872 A1 | 6/2015 | Beaulieu et al. | |
| 2015/0375971 A1 | 12/2015 | Henkel et al. | |
| 2016/0031681 A1 * | 2/2016 | Delplace | ................ B66C 15/06 |
| | | | 345/420 |
| 2016/0034730 A1 | 2/2016 | Delplace | |
| 2016/0288318 A1 * | 10/2016 | Nakazato | ............... B25J 9/1666 |
| 2017/0206710 A1 * | 7/2017 | Touma | ................. G09G 3/2092 |
| 2018/0170720 A1 * | 6/2018 | Mannari | ................ B66C 13/16 |
| 2018/0237274 A1 | 8/2018 | Rantala | |
| 2018/0252921 A1 * | 9/2018 | Rantala | .................. G06F 3/0487 |
| 2018/0282131 A1 | 10/2018 | Hayashi | |
| 2019/0019429 A1 | 1/2019 | Palberg et al. | |
| 2019/0039862 A1 | 2/2019 | Palberg et al. | |
| 2019/0100414 A1 | 4/2019 | Schilling et al. | |
| 2019/0284027 A1 * | 9/2019 | Albrecht | ................. B66C 13/46 |

FOREIGN PATENT DOCUMENTS

| | | |
|---|---|---|
| JP | 2016-34878 | 3/2016 |
| JP | 2017-75001 | 4/2017 |
| RU | 130985 | 8/2013 |
| WO | 2016/019173 | 2/2016 |
| WO | 2017/032921 | 3/2017 |
| WO | 2017/032922 | 3/2017 |
| WO | 2017/121636 | 7/2017 |

* cited by examiner

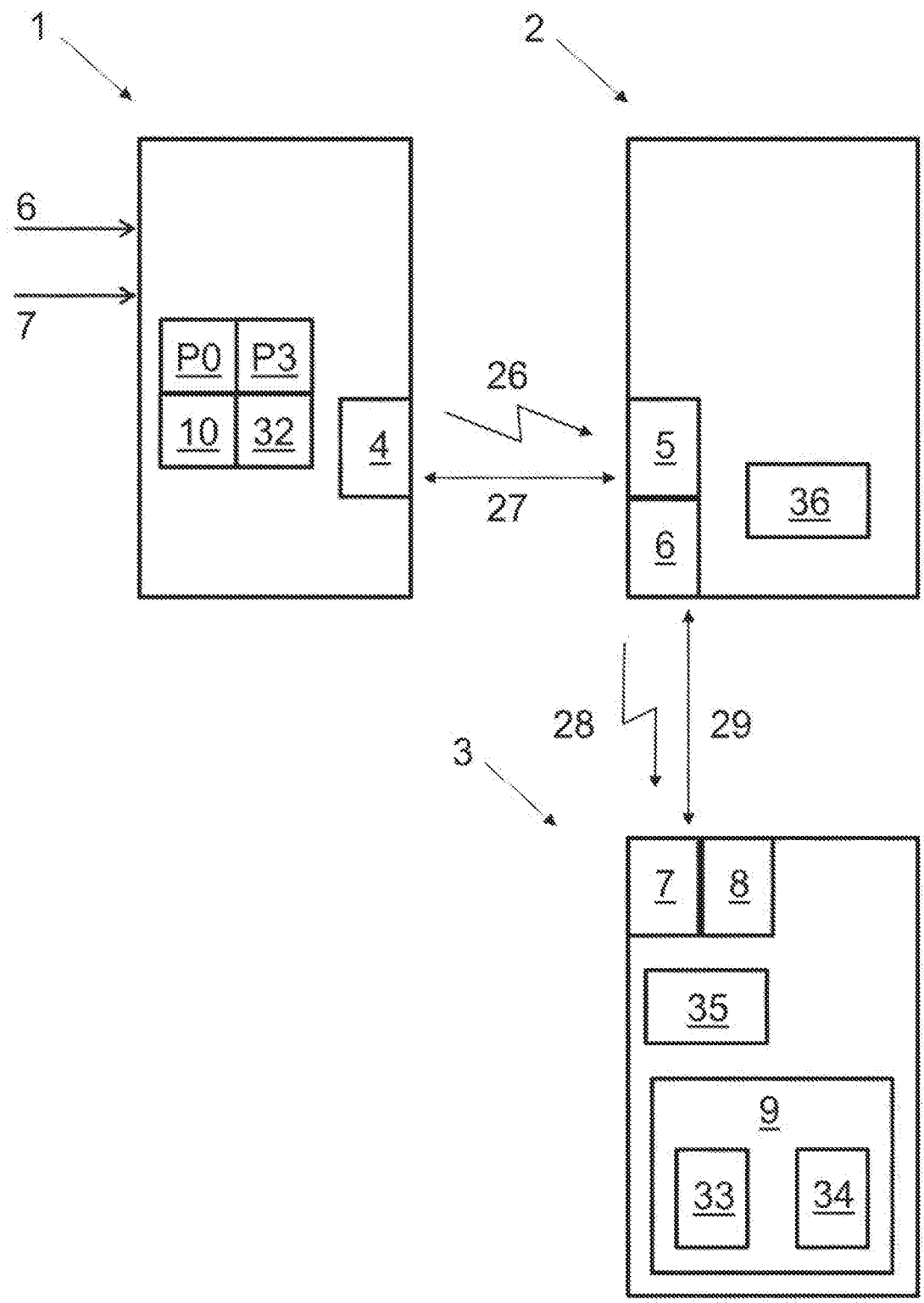

LOADING CRANE CONTROLLER WITH USER WORN REMOTE CONTROL INPUT AND DISPALY DEVICE

BACKGROUND OF THE INVENTION

The invention concerns an operating device for a loading crane, and a loading crane having such an operating device.

An operating device of the general kind set forth has long been used in loading cranes.

What is problematical in that respect is that loading cranes have a highly dynamic field of use, which makes it difficult to plan operations thereof. Therefore safety-relevant decisions have to be made by the user of the crane during operation thereof on site. Frequently the working area can be difficult to oversee, and the result of this is that the user has to change his position. The user often has to turn his view away from the load to be craned in order to look at the operating device. Often the user is uncertain about the currently prevailing operating parameters of the crane. If the user is to have a clear picture about the currently prevailing operating parameters of the crane the question which also arises is how they can be processed and communicated to the user.

SUMMARY OF THE INVENTION

The object of the invention is to provide an operating device of the general kind set forth and a loading crane, in which the above-discussed problems are avoided.

Like an operating device of the general kind set forth for a loading crane, the operating device which is used in relation to the present invention also has a crane controller for controlling actuators of the loading crane and an input device for the input of control commands for the crane controller. In that case the actuators of the loading crane are controlled by the crane controller based on the input control commands. In addition the crane controller is adapted to evaluate sensor signals from sensors of the loading crane and to generate sensor data on the basis of the sensor signals. Furthermore the input device is spatially separate from the crane controller, as is the case for example with a radio remote control.

The crane controller has a first telecommunication device for the exchange of data signals with the input device, the data signals delivered by the crane controller including sensor data. Similarly thereto, the input device has a second telecommunication device for the exchange of data signals with the first telecommunication device, the data signals delivered by the input device including control commands. Therefore (inter alia) data signals in the form of sensor data and control commands can be exchanged by the crane controller and the input device.

According to the invention, the operating device has a signaling device which is spatially separate from the input device and which can be worn by a user on the body. In that respect, the input device has a transmitting device for the delivery of data signals which can be received by a receiving device of the signaling device. It is further provided that the signaling device, which can be worn by a user on the body, has a displaying device, by which audio and/or image data can be displayed, wherein the signaling device signals the audio data and/or image data to a user.

The represented audio data and/or image data may include information about the currently prevailing operating parameters of the loading crane and optionally the operating device itself, information about a working process or lifting process of the loading crane, which is planned, which is currently being performed or which is to be performed, information about the surroundings of the crane and/or the user or information for the support of repair and/or maintenance operations on the loading crane. The working stress for a user can be reduced and the operating safety of a loading crane can be enhanced by the representation of audio data and/or image data.

The audio data and/or image data are basically (but not necessarily exclusively) produced on the basis of the sensor data, wherein there are provided three variants for the generation thereof:

In a first variant, the data signals delivered by the crane controller to the input device include sensor data and the input device delivers those data to the signaling device by means of the transmitting device. The signaling device has a processor which now generates the audio data and/or image data on the basis of those sensor data.

In a second variant, the input device has a processor which generates the audio data and/or image data on the basis of the sensor data delivered by the crane controller to the input device. The audio data and/or image data are now output by means of the transmitting device to the signaling device.

In a third variant, the controller has a processor which generates audio data and/or image data on the basis of the sensor data, and outputs same to the input device by means of the first and second telecommunication devices and the input device delivers the audio data and/or image data to the signaling device by means of the transmitting device.

Therefore, the three variants substantially differ as to where the audio data and/or image data which are signaled to a user by the signaling device are generated on the basis of the sensor data.

The crane controller is adapted to control actuators of the loading crane. Control of the actuators is effected on the basis of control commands, wherein the control can include for example switching valves (like for example a directional control valve), hydraulic devices or supplying power to electrical devices.

The actuators can generally involve electric or hydraulic drives of a loading crane or mobile crane like for example hydraulic cylinders, electric or hydraulic drives of winches, electric or hydraulic drives of slewing drives or electric or hydraulic drives for or of working devices or attachments.

Control commands for the crane controller can be input by the input device which is spatially separate from the crane controller. Input of the control commands can be effected for example by a user by way of a keypad, operating knobs, operating levers or the like. In that respect however the possibility should not be excluded that control commands for the crane controller can also be input by other units of the operating device. The input device can be arranged for example in a mobile operating console like for example a radio remote control, or in an operating station. The mobile operating console which can be portable and the operating station which can be arranged on the loading crane and/or on a vehicle having a loading crane can communicate wirelessly or wired with the crane controller. The input device can therefore be in the form of a mobile controller or a mobile control module. The input device can be interpreted as (at least one) part of a stand-alone (possibly portable) operating unit, with which a user can move substantially freely in a certain area around a loading crane or a hydraulic lifting apparatus.

The sensors of the loading crane can be sensors for detecting the state of the loading crane and the state of attachments and the area around the loading crane. Examples of such sensors are for instance pressure sensors, rotary encoders, angle sensors, force measuring cells, optical sensors, ultrasound sensors, proximity sensors, acoustic sensors, temperature sensors or acceleration sensors. Sensor signals can respectively emanate from those sensors like for example analog and/or digital electrical signals. The crane controller is adapted to generate corresponding sensor data from the sensor signals fed to the crane controller for example by way of wired or wireless signal connections. Thus for example sensor data corresponding to a measured pressure can be generated by the crane controller from an electric voltage output by a pressure sensor. In generation of the sensor data for example the geometry, equipment and operating state of the loading crane can be incorporated.

Data signals which are exchanged between the crane controller and the input device can include sensor data and control commands.

Data signals exchanged between the input device and the signaling device can include sensor data, however it should not be excluded that those data signals also include control commands.

A user can be a person who is operating the loading crane by means of control commands. In that respect it can be provided that the loading crane is also operated by a plurality of users.

The signaling device is designed so that it can be worn by a user on the body, that is to say the at least one part of the signaling device can be arranged on or at a part of the body of a user. Such a signaling device can be in the form of data goggles, a smartwatch, a smartphone, a tablet, a headset, ear buds and the like.

Furthermore, the signaling device has a displaying device, by means of which audio data and/or image data can be displayed to a user. Image data can be reproduced by the displaying device in such a way that they can be optically perceived by a user. A displaying device for image data, that is to say an optical display, can be for example in the form of an optical display like for example an at least partially opaque, semi transparent or transparent display. Audio data can be reproduced by a displaying device for audio data in such a way that they can be perceived acoustically by a user. A displaying device for audio data, that is to say an acoustic display, can be for example in the form of a sound transducer like for example a loudspeaker or a bone conduction headphone. The audio data and/or image data can basically include status information about the operating state of the loading crane, information relating to the area around the loading crane and the user as well as acoustic and/or optical warning alerts.

The signaling device can superimpose the image data at least on a part of a visual field of the user or fill at least a part of a visual field of the user with the image data. The audio data and/or image data can be displayed to the user without the user having to turn his view away from what is actually happening at the time, that is to say for example a working operation or lifting operation which is currently being performed. Audio data and/or image data of regions which are outside the visual field of the user can also be represented to the user.

In that respect, it may be advantageous that the signaling device superimposes the visualized image data only on a part of the visual field of the user or fills only a part of the visual field of the user with the image data. The image data are therefore not superimposed on the entire visual field of the user or it is not the entire visual field of the user that is filled with image data. With a suitably designed signaling device therefore the user always sees a real image on which a virtual image is superimposed. In the case of lags in the representation or even a failure of the superimposed or inserted image (virtual image) the user always still has what is actually happening (the real image) in his field of view.

The processor or a processor of the crane controller, the input device or the signaling device is adapted to produce audio data and/or image data on the basis of the sensor data. The processor can be in the form of an autonomous component or a data-processing logic unit (for example a processor core).

The first and second telecommunication devices can be in the form of wireless telecommunication devices, preferably short-wave telecommunication devices, particularly preferably ISM telecommunication devices, wifi telecommunication devices or Bluetooth® telecommunication devices. Generally the transmitting device and the receiving device can be in the form of wireless communication devices or wired telecommunication devices.

It can be advantageous for sensor data and control commands to be communicated by way of different communication channels or by way of the same communication channel. It can therefore be provided that the communication of given data signals is effected by way of a dedicated parallel second transmission channel. In that way for example the transmission of control commands and the transmission of other data signals can be effected separately from each other. Thus it is also possible to use different communication standards. Thus it can be possible for safety-relevant data signals like for example a control command to use certified hardware with for example suitable encryption, frequency spread or plausibility control while for the transmission of other data signals it is possible to use a simpler and possibly also faster connection like for example an ISM radio connection.

It can be advantageous in that respect for the communication channel or channels to be encrypted. In that way eavesdropping on or influencing of the transmission of data signals can be prevented or made difficult. The demands on encryption can in that case distinguish different data signals.

It can be advantageous if the transmitting device of the input device is formed by the second telecommunication device.

It can generally be advantageous if the input device has a power storage means for the power supply for the signaling device. The power supply which can also include charging up a power storage device of the signaling device can be effected in that case in wired or wireless fashion (for example inductively).

The crane controller for generating the sensor data from the sensor signals is or can be connected to a cloud computing computer unit. Thus, for example, the sensor signals detected by the crane controller, which correspond to the geometry, equipment and the operating state of the loading crane, can be communicated to a cloud service by way of a suitable telecommunication device. There, sensor data can be generated from the communicated sensor signals by the cloud computing unit and subsequently communicated to the crane controller.

It can be advantageous if the crane controller detects the position of the signaling device. Alternatively thereto or in combination therewith it can be provided that the signaling device detects a position of the user and/or a part of the body of the user and/or a visual field of the user (direction of view) relative to the loading crane. Detection of the or a position and/or the visual field can be effected for example by radio direction finding, a GPS system or by means of an optical detection device like for example a camera of the signaling device.

The detected position or positions or the detected visual field are communicated as data signals which can be generated for example by a processor to the input device by means of a communication device and the input device outputs the communicated data signals to the crane controller by way of the second and first telecommunication device. The crane controller is adapted to implement control commands output by a user in dependence on the detected position of the signaling device and/or the user and/or the part of the body of the user and/or the visual field of the user relative to the loading crane. Detection of the or a position and/or the visual field can be effected for example by way of radio direction finding, a GPS system or by means of an optical detection device like for example a camera of the signaling device.

The output of control commands by a user or the implementation of control commands by the crane controller can therefore be permitted or prevented in dependence on the detected position of the signaling device and/or the user and/or the part of the body of the user and/or the visual field of the user relative to the loading crane. It is also possible for control commands to be generated in dependence on the detected position of the signaling device and/or the user and/or the part of the body of the user and/or the visual field of the user. Thus for example a so-called gesture control can be implemented for example by detection of the position or positions.

It is further possible for audio data and/or image data to be displayed in dependence on the detected position or positions.

As already mentioned in the opening part of this specification protection is also claimed for a loading crane having an operating device as described hereinbefore.

BRIEF DESCRIPTION OF THE DRAWINGS

Embodiments by way of example of the invention are discussed with reference to the Figures in which:

FIGS. 2*a* to 2*c* show various configurations of the operating device,

DETAILED DESCRIPTION OF THE INVENTION

Figure 1:
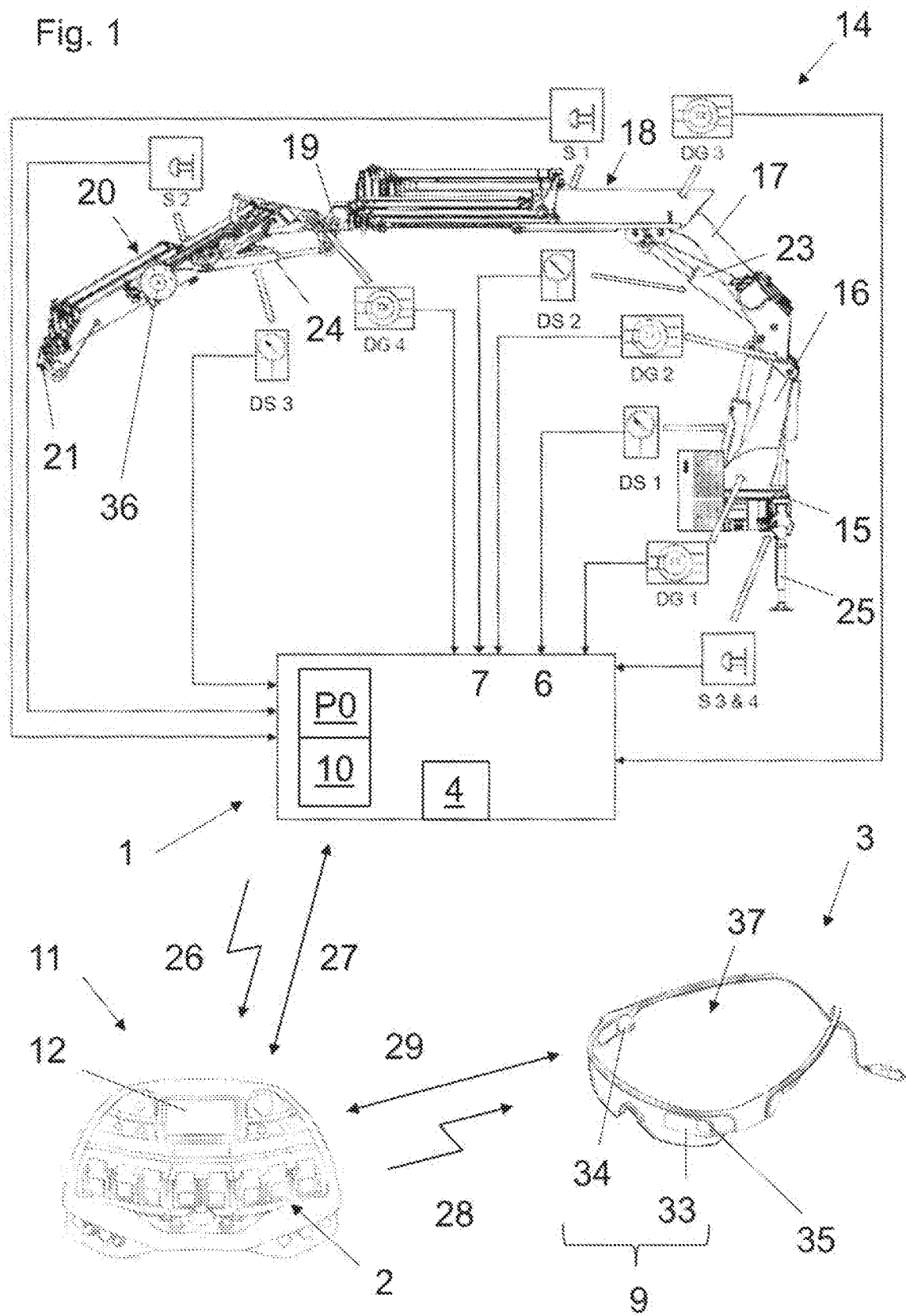
FIG. 1 shows an embodiment of a loading crane with an operating device.

FIG. 1 shows an embodiment of a loading crane 14 with an operating device in the form of a crane controller 1, an input device 2 and a signaling device 3. In the illustrated structure, the input device 2 is arranged at a mobile operating console 11 and the signaling device 3 is in the form of data goggles 37. To detect a visual field of the signaling device 3 in the FIG. 1 embodiment, it has an optical detection device 33 such as a camera.

The loading crane 14 can be mounted with its crane base 15 for example on a vehicle. A crane post 16 rotatable about a vertical axis is mounted on the crane base 15. A lift arm 17 which is pivotable about a horizontal axis by means of an actuator in the form of a hydraulic cylinder 22 is arranged on the crane post 16. In turn arranged on the lift arm 17 is a crane arm extension 18 which is pivotable about a horizontal axis by means of a further actuator in the form of a hydraulic cylinder 23, the extension 18 having at least one telescopic extension boom arm 19. As shown in the FIG. 1 embodiment an attachment arm 20 can be arranged on the crane arm extension 18, the arm 20 also being pivotable by means of a further actuator in the form of a hydraulic cylinder 24 about a horizontal axis. Equally, the attachment arm 20 can have at least one telescopic extension boom arm 21. For additional support for the loading crane 14 or a vehicle carrying the loading crane 14 there is provided a support arrangement with outriggers, of which one outrigger 25 is shown in the FIG. 1 view and which can have extendable telescopic support legs. In addition a working unit 36 in the form of a winch is arranged on the attachment arm 20 of the loading crane 14.

Besides the above-mentioned components, the loading crane 14 has various sensors for detecting the instantaneous position or geometry of the loading crane 14. For the outriggers 25, there are switches S3, S4 for detecting the supporting state of the outrigger on the ground. It is also conceivable that the extended position of the outrigger 25 is detected by a travel measuring device (not shown here). A rotary encoder DG1 is provided for detecting the rotary angle of the crane post 16 relative to the crane base 15. A further rotary encoder DG2 is provided for detecting the bend angle in a vertical plane between the crane post 16 and the lift arm 17. The hydraulic pressure in the hydraulic cylinder 22 of the lift arm 17, which pressure is characteristic of the crane capacity, involves a pressure sensor DS1. A rotary encoder DG3 is provided for detecting the bend angle between the lift arm 17 and the crane arm extension 18 in a vertical plane. A pressure sensor DS2 is provided for detecting the hydraulic pressure in the hydraulic cylinder 23 of the crane arm extension 18. A switch S1 is provided for detecting the retraction state of an extension boom arm 19 of the crane arm extension 18. A rotary encoder DG4 is further provided for detecting the bend angle between the crane arm extension 18 and the attachment arm 20 in a vertical plane. A pressure sensor DS3 is provided for detecting the hydraulic pressure of the hydraulic cylinder 24 of the attachment arm 20. A switch S2 is provided for detecting the retraction state of an extension boom arm 21 of the attachment arm 20. In principle, it should not be excluded that the extension position of the individual extension boom arms is detected by an extension position sensor with, for example, a travel measuring device.

The sensor signals are respectively fed to the crane controller 1 by signal inputs, of which by way of example the signal inputs 6, 7 for the sensor signals of the pressure sensors DS1, DS2 are shown. Sensor data are then computed in the crane controller 1 from those sensor signals and from data stored in a memory 10 and in this example specific to the loading crane 14, by a processor P of the crane controller 1, the sensor data being characteristic of the currently prevailing lift load situation or the operating state of the loading crane 14. The data specific to the loading crane 14 can be, for example, information relating to equipment, functions and limit values of operating parameters of the loading crane 14 and any working units. Thus, for example, sensor data which correspond to a measured pressure in the corresponding hydraulic cylinders 22, 23 can be calculated from the electrical voltages or signals output by the pressure sensors DS1, DS2. The crane controller 1 can also be connected to a cloud computing computer unit for generation of the sensor data from the sensor signals. Thus, for example, the sensor signals detected by the crane controller 1 can be communicated to a cloud service by a suitable telecommunication device. There sensor data can be generated from the communicated sensor signals by the cloud computing computer unit and subsequently communicated to the crane controller 1. It can also be possible to transmit specific data for the loading crane 14 to a cloud service or to retrieve same from a cloud service.

The crane controller 1 is adapted to control the actuators of the loading crane 14. Control commands for the crane controller can be delivered by the input device 2. The input device 2 can be spatially separate from the crane controller 1 and in the illustrated embodiment is arranged in a mobile operating console 11.

Figure 2A:
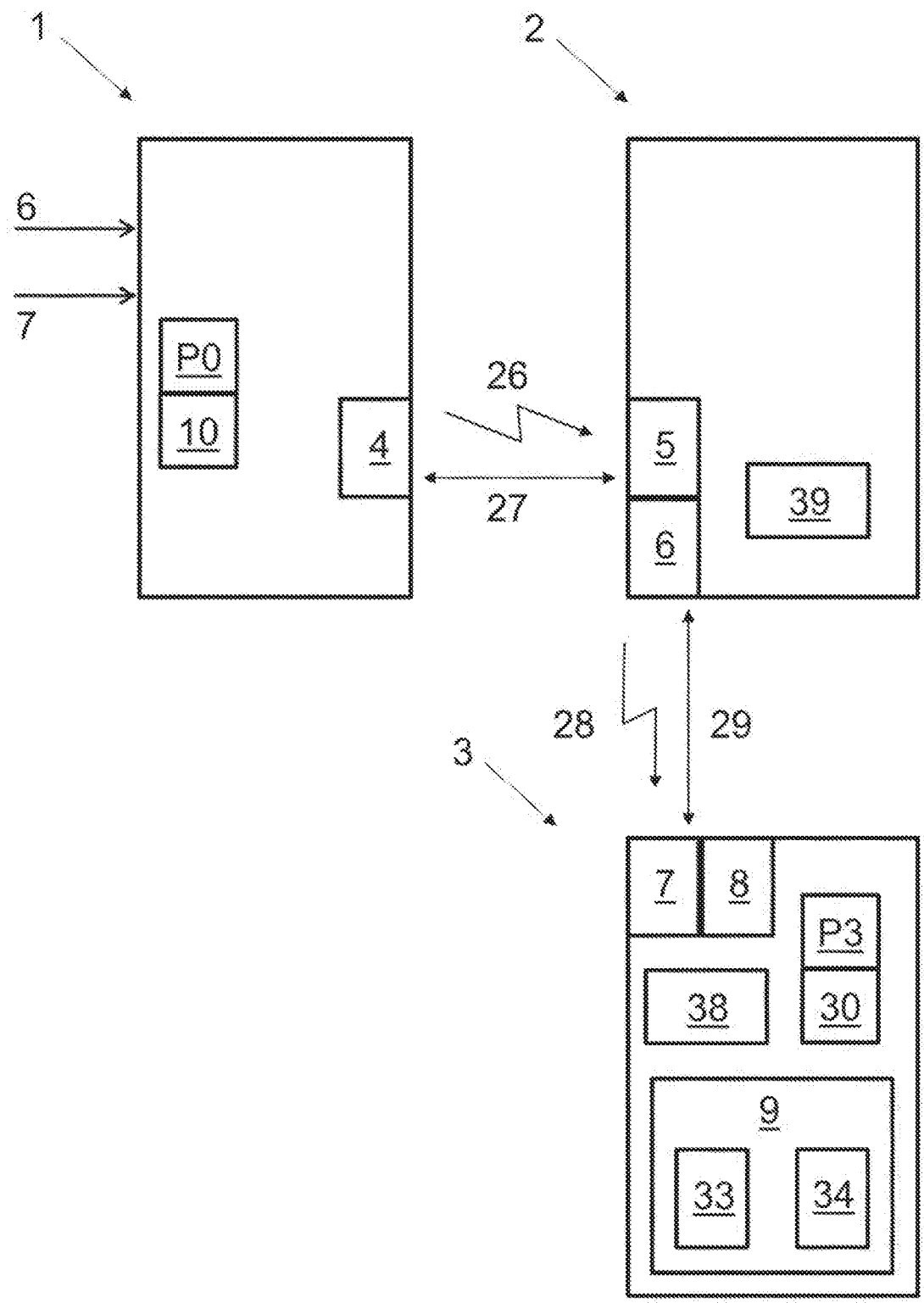
Figure 2B:
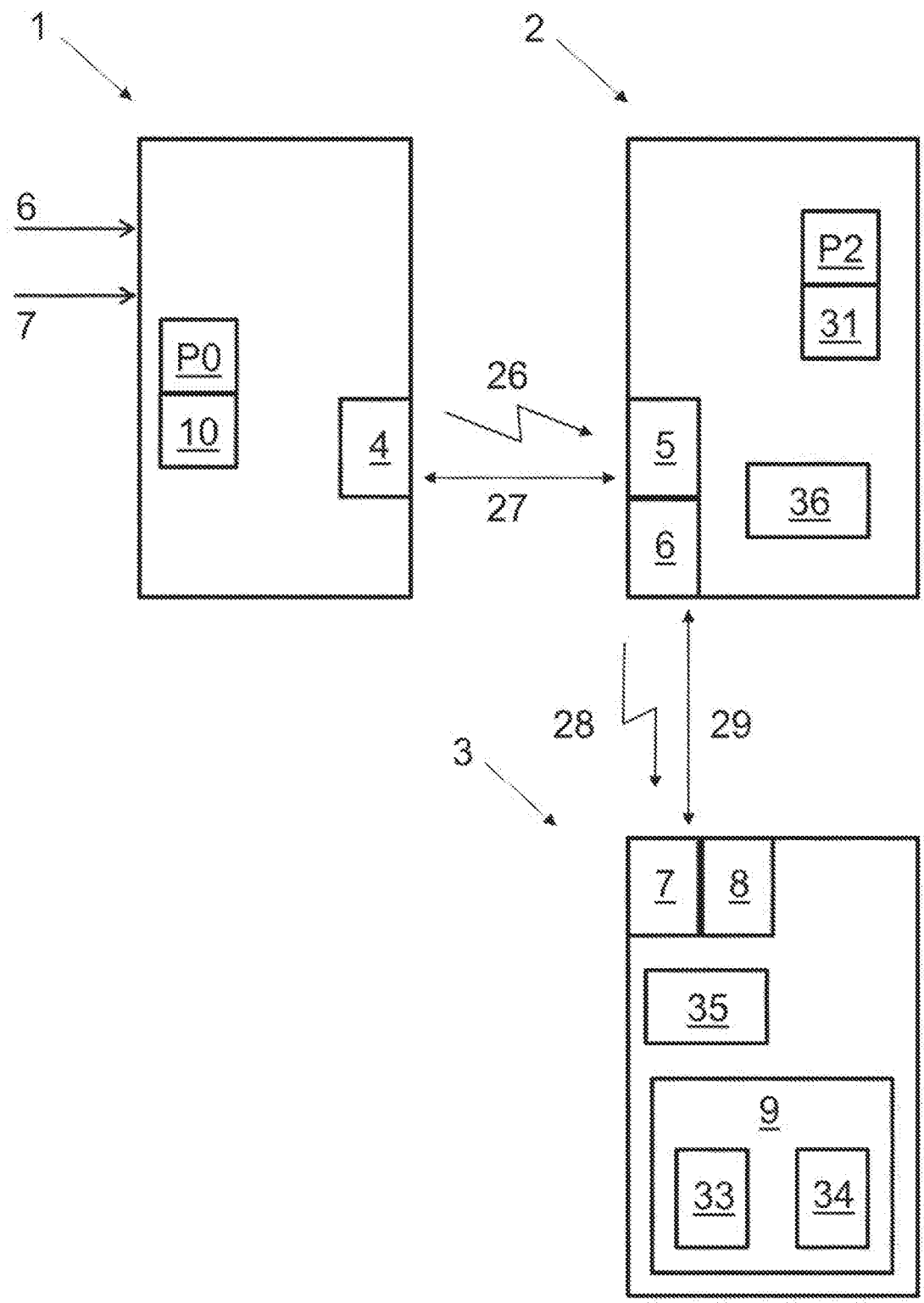

As can also be seen from a comparison with FIGS. 2a, 2b and 2c which respectively show diagrammatically different configurations of the operating device the crane controller 1 in each case has a first telecommunication device 4 for the exchange of data signals with the input device 2 and the operating console 11, wherein the data signals delivered by the crane controller 1 include the sensor data. Similarly thereto, the input device 2 has a respective second telecommunication device 5 for the exchange of data signals with the first telecommunication device 4, and the data signals supplied by the input device 2 include control commands.

The operating device further has a respective signaling device 3 which can be worn by a user (41) on the body. It is provided that the input device 2 has a respective transmitting device 6 for outputting data signals, wherein the data signals can be received by a receiving device 7 of the signaling device 3. It is further provided that the signaling device 3 which can be worn by a user (41) on the body has a displaying device 9, by which a user (41) can be displayed audio data and/or image data. The displaying device 9 in that case can include an optical display 33 as discussed hereinbefore as well as an acoustic display 34 as discussed hereinbefore. The signaling device 3 can generally have a processor which for example is adapted to control the displaying device 9 corresponding to the signaling or reproduction of the audio data and/or image data. The operating console 11 can also have a display 12 (and a processor suitably adapted for the display), which for example can serve for the display of data signals like for example sensor signals. It can be provided that the transmitting device 6 of the input device 2 is formed by the second telecommunication device 5.

The input device 2 and the signaling device 3 can respectively have a power storage element 38, 39. The power supply of the signaling device 3 can however also be implemented by the input device 2, like for example the power storage element 38 thereof and a suitable connection.

The signaling device 3 can have a communication device 8, by which a detected position or a detected visual field of the signaling device 3 can be communicated to the input device 2 as data signals which for example can be generated by a processor of the signaling device 3.

FIG. 2a shows a first configuration of the operating device. In this configuration, data signals which include sensor data are delivered by the crane controller 1 to the input device 2 by a wireless connection 26 and/or a wired cable connection 27 supported by the first telecommunication device 4 and the second telecommunication device 5. The input device 2 passes those sensor data to the signaling device 3 by a wireless connection 28 and/or a wired cable connection 29 supported by the transmitting device 6 and the receiving device 7. In this embodiment, the signaling device 3 has a processor P3 which now on the basis of those sensor data generates the audio data and/or image data which are to be signaled to a user (41). It will be appreciated that a storage element 30 for the storage of computed and/or received data can be provided for the signaling device 3.

FIG. 2b shows a second configuration of the operating device. In this configuration, the input device 2 has a processor P2 which on the basis of the sensor data delivered by the crane controller 1 to the input device 2 generates the audio data and/or image data which are to be displayed to a user (41). It is accordingly provided that the audio data and/or image data are delivered by the transmitting device 6 to the receiving device 7 of the signaling device 3. It will be appreciated that a storage element 31 for the storage of computer and/or received data can be provided for the input device 2.

FIG. 2c shows a third configuration of the operating device. In this configuration, the crane controller 1 has a processor P3 which produces audio data and/or image data on the basis of the sensor data and delivers same to the input device 2 by the first and second telecommunication devices 4, 5. The input device 2, by the transmitting device 6, delivers the audio data and/or image data to the signaling device 3.

As can be seen from the configuration of the crane controller 1 in FIG. 1, the configuration of the operating device shown in FIG. 1 can correspond to that of FIG. 2a or FIG. 2b. With the provision of a processor P3 (and optionally a storage element 32) the configuration of the operating device shown in FIG. 1 however can also be of a design corresponding to the configuration shown in FIG. 2c.

Generally, it should not be excluded that the processors P1, P2, P3 for generating the audio data and/or image data are in the form of an independent processor or an independent component or a data-processing logic unit (for example a processor core) of an existing processor. Similarly, thereto the storage elements 30, 31, 32 can be independent or in the form of part of existing storage elements.

Figure 3:
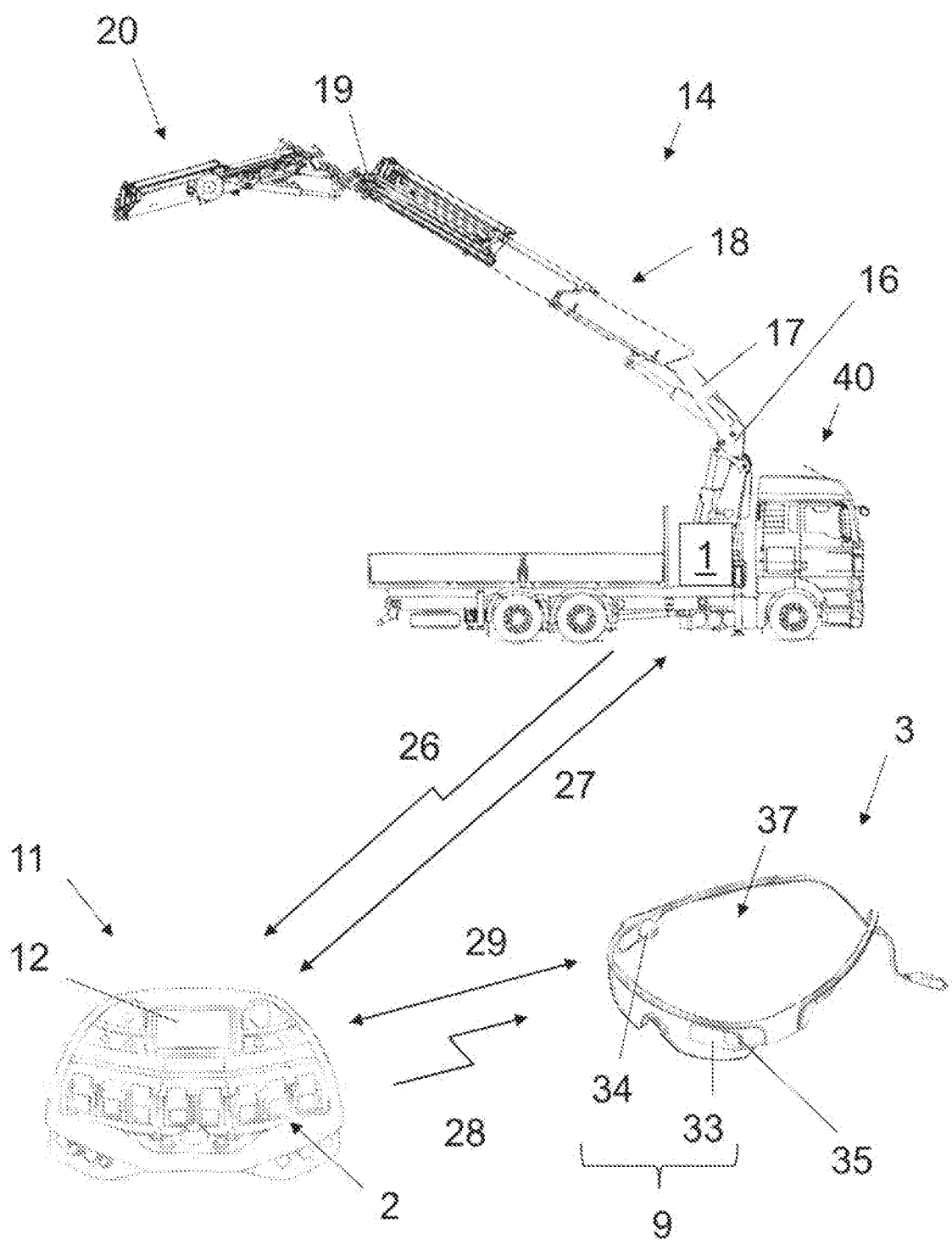
FIG. 3 shows a vehicle with a loading crane and an operating device.

FIG. 3 shows a vehicle 40 having a loading crane 14 and an embodiment as shown for example in FIG. 1 of the operating device with an input device 2 and a signaling device 3.

Figure 4:
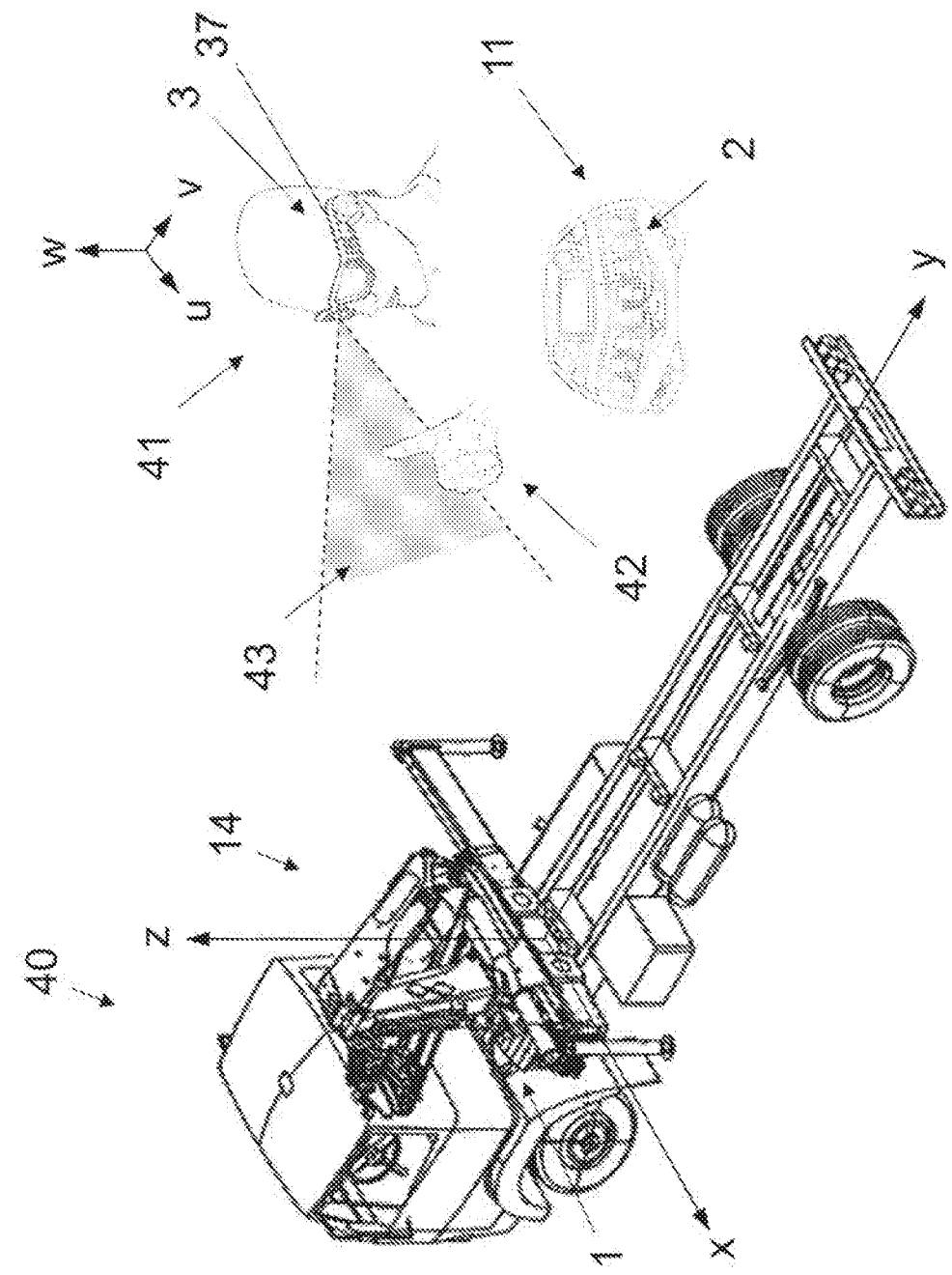
FIG. 4 shows a vehicle with a loading crane and an operating device and a user.

FIG. 4 shows a further embodiment of a vehicle 40 having a loading crane 14 and a configuration as show for example in FIG. 1 of the operating device with an input device 2 and a signaling device 3 which is carried by a user 41, in the form of a further configuration of data goggles 37. The operating device can be so designed that the position of the signaling device 3 is detected by the crane controller 1. In the illustrated embodiment therefore the position of the signaling device 3 can be detected in the coordinate system x,y,z of the vehicle 40 or the loading crane 14.

In addition, the signaling device 3 can detect a position of the user 41. In the illustrated embodiment, it is also possible to determine the orientation of the coordinate system u,v,w of the signaling device 3 relative to the coordinate system x,y,z of the vehicle 40 or the loading crane 14—and thus an orientation of the user 41 relative to the vehicle 40 or the loading crane 14.

It is further possible to detect the position of a part of the body 42 of the user 41 relative to the loading crane 14 or relative to the signaling device 3. Furthermore, the visual field 43 of the user 41 can be detected relative to the loading crane 14. Thus, for example it is also possible to detect the position of a part of the body 42 of the user 41 in the visual field 43 of the user 41. In that way, it is also possible for example to detect a sequence of movements of a part of the body 42 of the user 41 (gestures). It that case, the visual field 43 of the user can be detected for example by way of an optical detection device (see reference 35 in FIG. 3).

The detected positions can be communicated by the signaling device 3 as data signals to the input device 2 by means of a communication device 8 and the communicated data signals can be further delivered to the crane controller 1 by the input device 2 by way of the second and first telecommunication devices 5, 4. The crane controller 1 can now basically be adapted depending on the detected positions to generate control commands and/or carry them out. Thus, control commands of the user 41 can be carried out depending on the detected position of the signaling device 3. Furthermore, control commands can be carried out depending on the detected position of the user 41, and therefore can be carried out depending on the detected orientation of the user 41 relative to the vehicle 40 or the loading crane 14. Control commands can further be carried out depending on the detected position of the part of the body 42 of the user 41, in which case that can for example also include the generation of control commands by the detected position of the part of the body 42 of the user 41 (gesture control). Furthermore, control commands can be carried out depending on the detected visual field 43 of the user 41 relative to the loading crane 14. Thus, for example, the implementation of control commands can also be prevented if it is assumed, by virtue of the detected visual field (or also the detected position) of the user 41, that the visual field or the user is not directed towards the vehicle 40 or the loading crane 14 or a working region of the loading crane 14.

LIST OF REFERENCES 1 crane controller
2 input device
3 signaling device
4 first telecommunication device
5 second telecommunication device
6 transmitting device
7 receiving device
8 communication device
9 displaying device
10 storage means
11 operating console
12 display
14 loading crane
15 crane base
16 crane post
17 lift arm
18 crane arm extension
19 extension boom arm
20 attachment arm
21 extension boom arm
22, 23, 24 hydraulic cylinder
25 outrigger
26 wireless connection
27 cable connection
28 wireless connection
29 cable connection
30 storage means
31 storage means
32 storage means
33 optical display
34 acoustic display
35 optical detection device
36 working unit
37 data goggles
38, 39 power storage means
40 vehicle
41 user
42 part of the body
43 visual field
x,y,z coordinate system crane
u,v,w coordinate system signaling device
P0 processor
P1, P2, P3 processor
S1, S2, S3, S4 switch
DG1, DG2, DG3, DG4 rotary encoder
DS1, DS2, DS3 pressure sensor

The invention claimed is:

1. An operating device for a loading crane, the operating device comprising: a crane controller for controlling actuators of the loading crane based on control commands, and for evaluating sensor signals from sensors of the loading crane and for generating sensor data based on the sensor signals; an input device spatially separate from the crane controller for allowing input of control commands for the crane controller; and a signaling device spatially separate from the input device and configured to be worn on a body of a user, wherein the crane controller has a first telecommunication device for exchanging data signals with the input device, wherein the data signals delivered by the crane controller include the sensor data, wherein the input device has a second telecommunication device for exchanging data signals with the first telecommunication device, wherein the data signals delivered by the input device include control commands, wherein the input device has a transmitting device for delivering the data signals, wherein the signaling device has a receiving device for receiving the data signals delivered by the transmitting device and a displaying device for displaying audio data and/or image data, wherein the signaling device transmits the audio data and/or image data to the user, wherein the crane controller, the input device, and the signaling device are configured in one of the following manners: (i) such that the data signals delivered by the crane controller include sensor data, the input device outputs the sensor data to the signaling device via the transmitting device, and the signaling device has a processor configured to generate the audio data and/or image data based on the sensor data, or (ii) the input device has a processor configured to generate the audio data and/or image data based on the sensor data delivered by the crane controller, and the input device delivers the audio data and/or image data via the transmitting device to the signaling device, or (iii) the crane controller has a processor configured to generate the audio data and/or image data based on the sensor data and to output the audio data and/or image data via the first telecommunication device and the second telecommunication device to the input device, and the input device delivers the audio data and/or image data to the signaling device via the transmitting device, wherein the signaling device is configured to superimpose the image data on at least a part of a visual field of the user or to fill at least a part of the visual field of the user with the image data.

2. The operating device according to claim 1, wherein the first telecommunication device and second telecommunication device are wireless telecommunication devices.

3. The operating device according to claim 2, wherein the first telecommunication device and second telecommunication device are short-wave telecommunication devices.

4. The operating device according to claim 3, wherein the first telecommunication device and second telecommunication device are ISM telecommunication devices, wifi telecommunication devices, or Bluetooth® telecommunication devices.

5. The operating device according to claim 1, wherein the transmitting device and the receiving device are wireless communication devices or wired telecommunication devices.

6. The operating device according to claim 1, wherein the input device is arranged in a mobile operating console or in an operating station.

7. The operating device according to claim 1, wherein the signaling device is formed as data goggles, a smartwatch, a smartphone, a tablet, a headset, or ear buds.

8. The operating device according to claim 1, wherein sensor data and control commands are communicated by different communication channels or by the same communication channel.

9. The operating device according to claim 1, wherein the transmitting device is formed by the second telecommunication device.

10. The operating device according to claim 1, wherein the input device has a power storage element for providing a power supply of the signaling device.

11. The operating device according to claim 1, wherein the crane controller is configured to be connected to a cloud computing computer unit for generating the sensor data from the sensor signals.

12. The operating device according to claim 1, wherein the signaling device is configured to superimpose visualized image data only on a part of the visual field of the user or to fill at least a part of the visual field of the user with the image data.

13. The operating device according to claim 1, wherein either:
- the crane controller is configured to detect a position of the signaling device, and/or
- the signaling device is configured to detect information comprising a position of the user and/or a part of the body of the user and/or a visual field of the user relative to the loading crane, and to communicate the information as data signals to the input device vis a communication device, and the input device is configured to deliver the communicated data signals to the crane controller via the second telecommunication device and first telecommunication device, and the crane controller is configured to carry out control commands of the user depending on the detected position:
- of the signaling device, and/or
- of the user, and/or a part of the body of the user, and/or the visual field of the user relative to the loading crane.

14. A loading crane having the operating device according to claim 1.

15. A vehicle having the loading crane according to claim 14.

* * * * *